United States Patent
Park et al.

(10) Patent No.: US 9,738,153 B2
(45) Date of Patent: Aug. 22, 2017

(54) INTERCOOLER AIR-GUIDE OF DUAL DUCT TYPE FOR IMPROVING CRASH PERFORMANCE

(71) Applicant: HYUNDAI MOTOR COMPANY, Seoul (KR)

(72) Inventors: Dang-Hee Park, Seoul (KR); Bong-Soo Kim, Hwaseong-si (KR); Yong-Beom Park, Gunpo-si (KR); Su-Whan Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 14 days.

(21) Appl. No.: 14/923,387

(22) Filed: Oct. 26, 2015

(65) Prior Publication Data
US 2016/0311312 A1    Oct. 27, 2016

(30) Foreign Application Priority Data
Apr. 24, 2015  (KR) .................. 10-2015-0057780

(51) Int. Cl.
*B60K 11/08*    (2006.01)
*B60K 11/06*    (2006.01)
*B60K 13/02*    (2006.01)

(52) U.S. Cl.
CPC .............. *B60K 11/08* (2013.01); *B60K 11/06* (2013.01); *B60K 13/02* (2013.01); *B60Y 2306/01* (2013.01)

(58) Field of Classification Search
CPC ......... B60K 11/00; B60K 11/08; B60K 11/04; B60K 28/14; B60K 13/02
See application file for complete search history.

(56) References Cited

U.S. PATENT DOCUMENTS

| | | | | |
|---|---|---|---|---|
| 4,690,204 A * | 9/1987 | Reichel | ................ | F01P 11/10 123/41.62 |
| 6,698,539 B2 * | 3/2004 | Decuir | ............... | B60K 13/02 180/225 |
| 7,383,905 B2 * | 6/2008 | Lang | ................ | B60K 11/04 180/68.1 |
| 8,365,854 B2 * | 2/2013 | Lee | ............... | B60K 11/00 180/68.1 |
| 8,491,050 B2 * | 7/2013 | Bauernfeind | ......... | B60K 11/08 296/193.09 |
| 8,893,835 B2 * | 11/2014 | Nam | ................ | B60K 11/04 180/68.1 |
| 2003/0183432 A1 * | 10/2003 | Suzuki | ............... | B60K 11/08 180/68.1 |
| 2006/0102109 A1 * | 5/2006 | Becker | ............... | B60K 11/08 123/41.48 |

FOREIGN PATENT DOCUMENTS

| | | |
|---|---|---|
| JP | 10-166969 A | 6/1998 |
| JP | 10-252485   | 9/1998 |
| JP | 2002-144889 A | 5/2002 |

(Continued)

*Primary Examiner* — Hau Phan
(74) *Attorney, Agent, or Firm* — Brinks Gilson & Lione (57) ABSTRACT

An intercooler air-guide of dual duct type for improving crash performance guiding head wind toward an intercooler may include a guide frame including a first opening portion and a second opening portion, and a guide portion coupled to the guide frame to improve crash performance of the intercooler air-guide of dual duct type.

6 Claims, 10 Drawing Sheets

(56) References Cited

FOREIGN PATENT DOCUMENTS

| JP | 2012-236504 A | 12/2012 |
|---|---|---|
| KR | 10-2009-0078957 | 7/2009 |
| KR | 10-925926 | 11/2009 |
| KR | 10-2012-0063822 | 6/2012 |
| KR | 10-2012-103145 | 9/2012 |

* cited by examiner

| | PRIOR ART | PRESENT INVENTION |
|---|---|---|
| FRONT WIND SPEED OF INTERCOOLER | | |
| AIR FLOW OF INTERCOOLER CROSS-SECTIONAL AREA | | |
| OUTLET TEMPERATURE | 35.9°C | 35.4°C (0.5°C ↓) |
| AIR FLOW RATE PASSING THROUGH INTERCOOLER | 891 CMH | 900 CMH (1% ↑) |

INTERCOOLER AIR-GUIDE OF DUAL DUCT TYPE FOR IMPROVING CRASH PERFORMANCE

CROSS-REFERENCE TO RELATED APPLICATION

This application claims to the benefit of Korean Patent Application No. 10-2015-0057780, filed on Apr. 24, 2015, which is incorporated herein by reference in its entirety.

FIELD

The present disclosure relates to an intercooler air-guide of dual duct type for improving crash performance.

BACKGROUND

The statements in this section merely provide background information related to the present disclosure and may not constitute prior art.

Generally, installed in engine compartment around an engine are an intake system composed of an air intake inhaling outside air passing through an air filter and an intake manifold connected to a combustion chamber, a condenser forming a cooling device and a radiator configuring an engine cooling system.

A turbo charger is additionally provided to an intake system of a diesel and a gasoline turbo engine other than a gasoline vehicle in order to compress outside air for increasing engine power. An intercooler is installed together with the turbo charger in order to cool the air coming out from the turbo charger.

In general, the turbo charger connects an exhaust gas circulation device to a turbine and connects the air intake to a compressor, and the intercooler is disposed at a position capable of largely receiving head wind in order to increase cooling efficiency by the head wind.

In the diesel and gasoline turbo vehicles, the intercooler is installed close to an front end portion forming a front side of the engine compartment together with the condenser and the radiator such that the cooling efficiency by the head wind flowing into the engine compartment can be increased while vehicle driving.

As the cooling efficiency by the head wind is increased, the condenser can improve the cooling performance of vehicle interior, the radiator can more smoothly prevent the engine from being overheated, and the intercooler can improve engine power and fuel efficiency with high efficiency.

The effective inflow of the head wind as described above can increase the cooling efficiencies of the condenser and the radiator, particularly, increase the cooling performance of the intercooler which is important for improving the engine power and the fuel efficiency.

Figure 1:
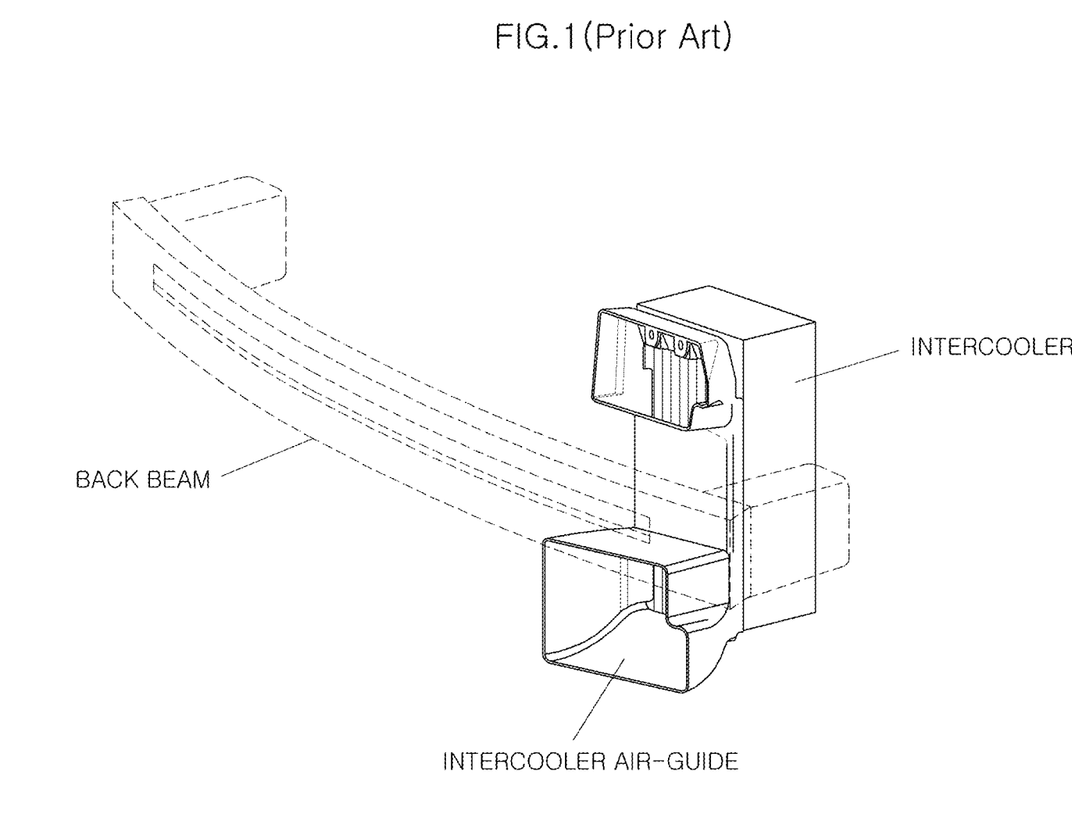
FIG. 1 and FIG. 2 are perspective views of an intercooler air-guide according to a prior art, respectively.
Figure 2:
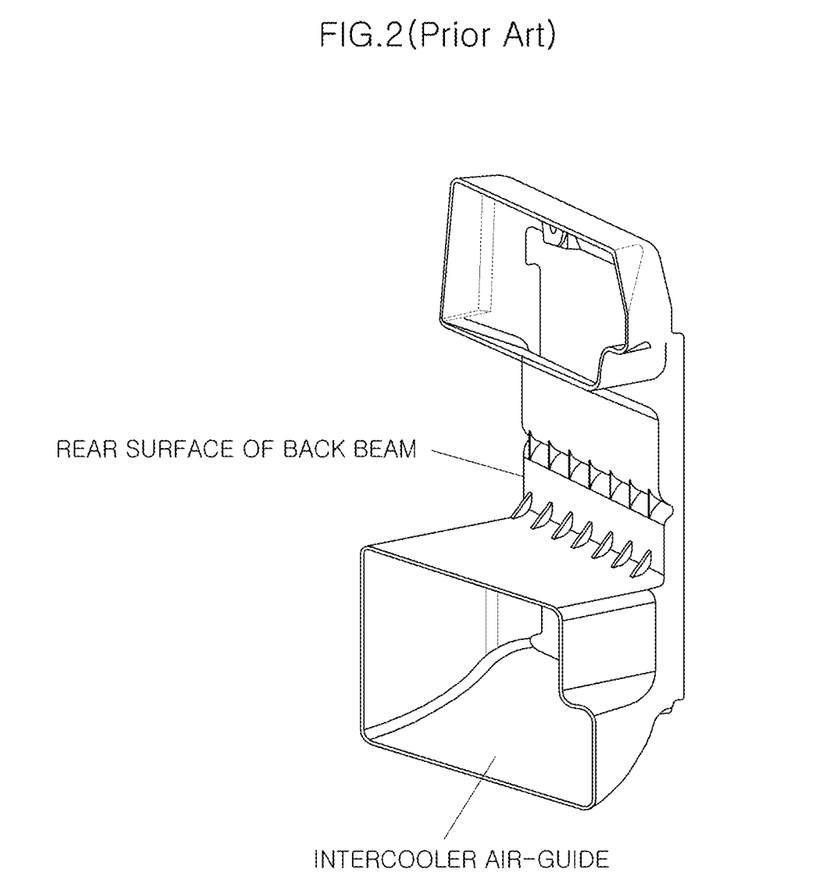
Figure 3:
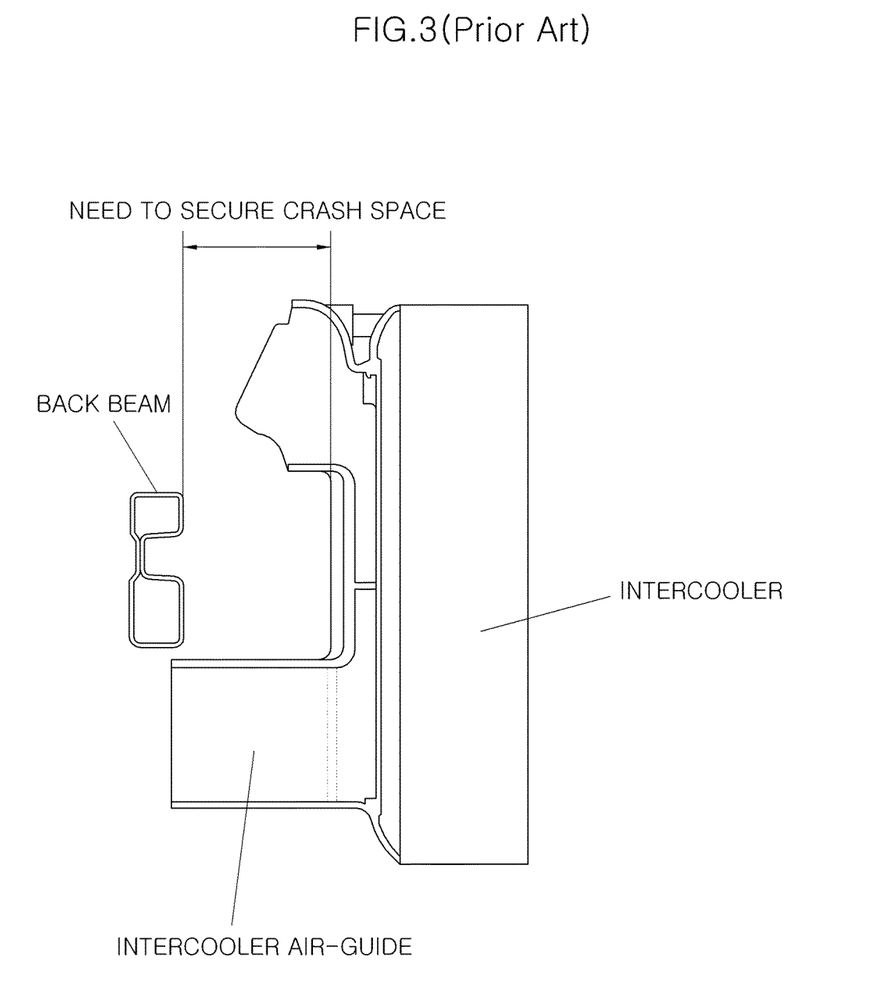
FIG. 3 is a cross sectional view of the intercooler air-guide according to the prior art.

For this, using the intercooler applying an air-guide of dual duct type has been a growing trend. However, as shown in FIGS. 1 to 3, the intercooler of dual duct type according to the prior art should be installed at a rear side of a back beam in order to secure crash performance when mounted at a vehicle. As such, the crash space more than a certain level is secured between the back beam and the air-guide. With this arrangement, the duct shape is limited and the intercooler performance is decreased.

SUMMARY

The present disclosure has been made to solve the above problems and an object of the present disclosure is to provide an intercooler air-guide of dual duct type including a guide portion formed with an elastic member for improving crash performance.

An intercooler air-guide of dual duct type for improving crash performance according to the present disclosure that guides head wind toward an intercooler, may include a guide frame having a first opening portion and a second opening portion; and a guide portion coupled to the guide frame to improve crash performance of the intercooler air-guide of dual duct type.

The first opening portion (or upper opening portion) may be disposed at an upper portion of a back beam and formed toward a vehicle driving direction.

The second opening portion (or low opening portion) may be disposed at a lower portion of the back beam and formed toward the vehicle driving direction.

The guide frame may include a hole formed between the first opening portion and the second opening portion.

The guide frame may include a first coupling portion formed to be protruded toward the vehicle driving direction around the hole.

The first coupling portion may include a first lower coupling portion protruded in parallel with the vehicle driving direction; and a first upper coupling portion protruded upwardly and slantly to form a predetermined angle with respect to the first lower coupling portion.

The guide portion may include a second coupling portion coupled with the first coupling portion.

The second coupling portion may include a second lower coupling portion coupled with the first lower coupling portion; and a second upper coupling portion coupled with the first upper coupling portion and formed upwardly and slantly to form the predetermined angle with respect to the second lower coupling portion.

The guide portion may include a direction induction guide formed at a side opposite to the vehicle driving direction and formed to be protruded in a direction vertical to the ground.

The material of the guide portion may be an elastic member capable of absorbing impact generated by vehicle crash.

In another form according to the present disclosure, an intercooler air-guide of dual duct type for a vehicle, comprising:
 a guide frame attached on an intercooler and forming an upper opening portion and a lower opening portion relative to a back beam, the upper and lower opening portions extending toward an opposite direction to the intercooler; and
 a guide portion coupled to the guide frame and being disposed between the upper and lower opening portions,
 wherein the guide portion defines, with a corresponding guide frame, an air channel through which an air flow flows from the upper and lower opening portions to the intercooler.

As described above, in accordance with the present disclosure, by maximally securing the duct capacity of the intercooler in a state of maintaining crash performance, the cooling efficiency of the intercooler is increased, thereby improving the vehicle performance such as vehicle output and fuel efficiency and so on.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Terms and words used in the present specification and claims are not to be construed as a general or dictionary meaning, but are to be construed as meaning and concepts meeting the technical ideas of the present disclosure. Therefore, the configurations described in the exemplary forms and drawings of the present disclosure are merely exemplary forms but do not represent all of the technical spirit of the present disclosure. Thus, the present disclosure should be construed as including all the changes, equivalents, and substitutions included in the spirit and scope of the present disclosure. Further, the detailed description of related well-known configurations and functions is not provided when it is determined as unnecessarily making the scope of the present disclosure unclear.

Figure 5:
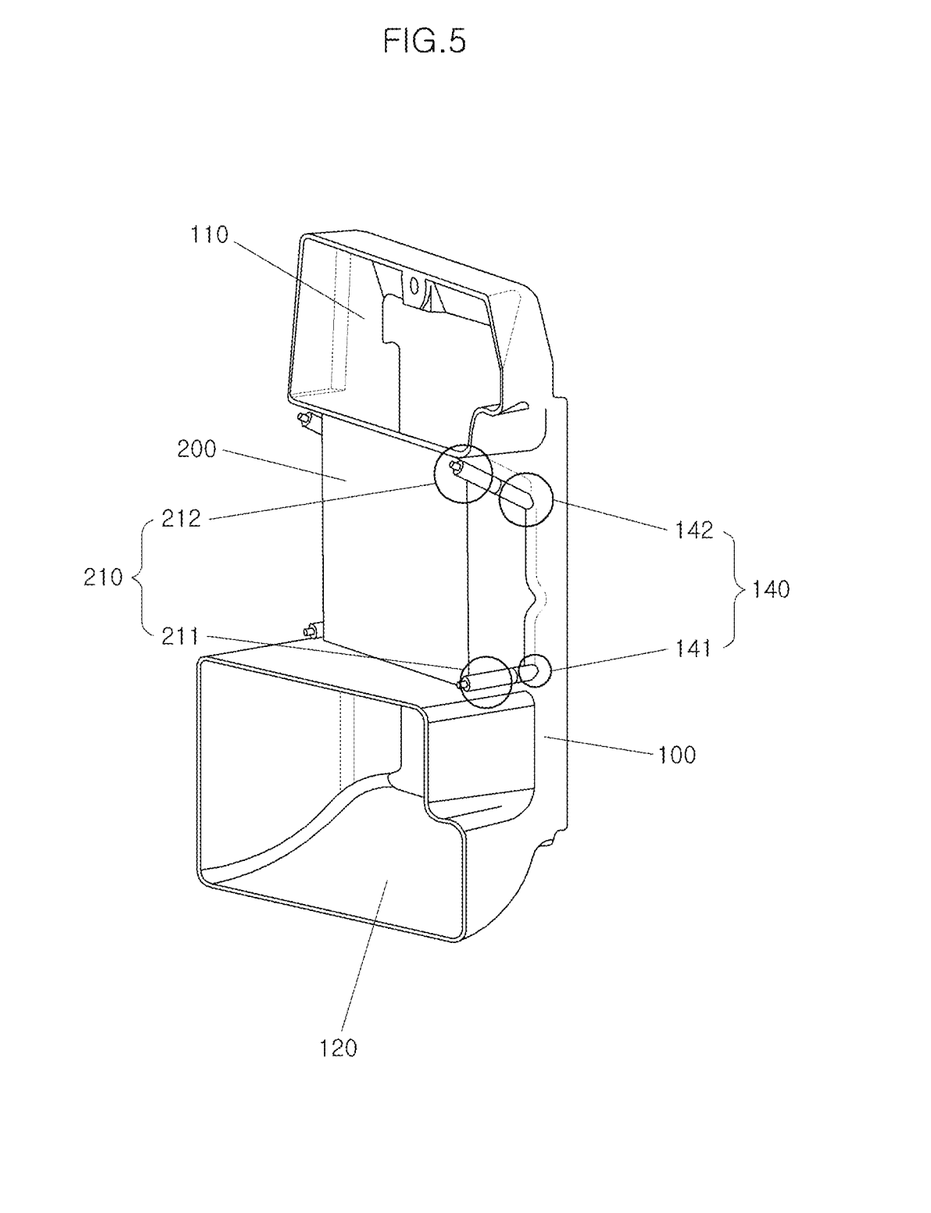
FIG. 5 is a front perspective view of an intercooler air-guide of dual duct type for improving crash performance according to the present disclosure.
Figure 6:
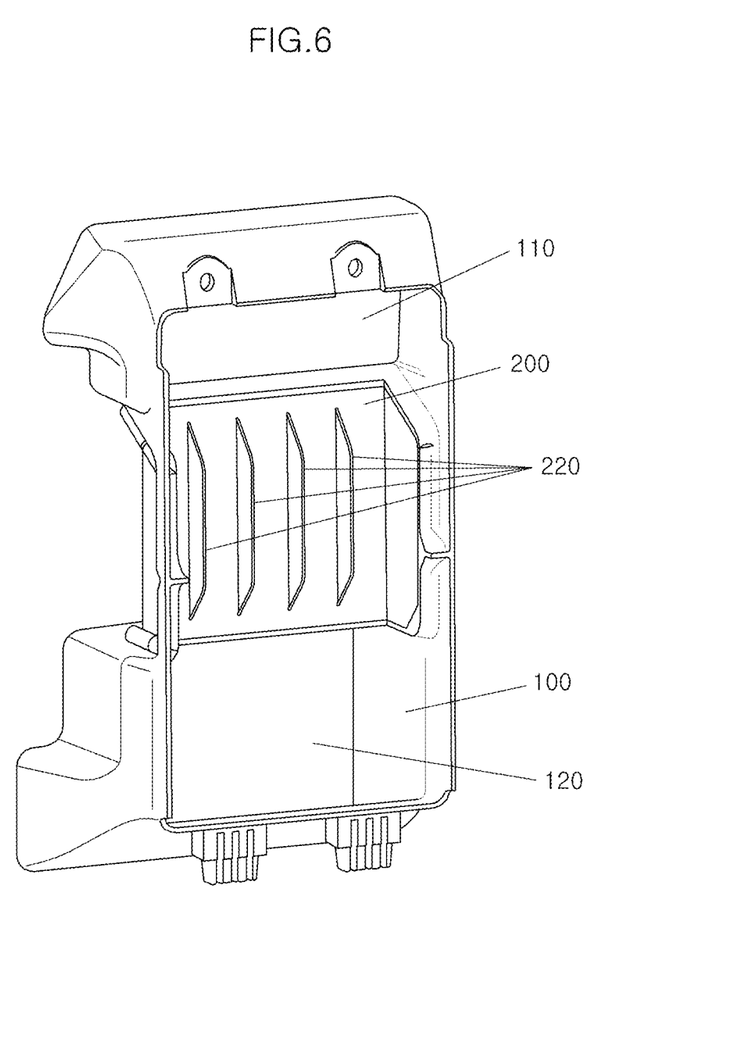
FIG. 6 is a rear perspective view of the intercooler air-guide of dual duct type for improving crash performance according to the present disclosure.
Figure 7:
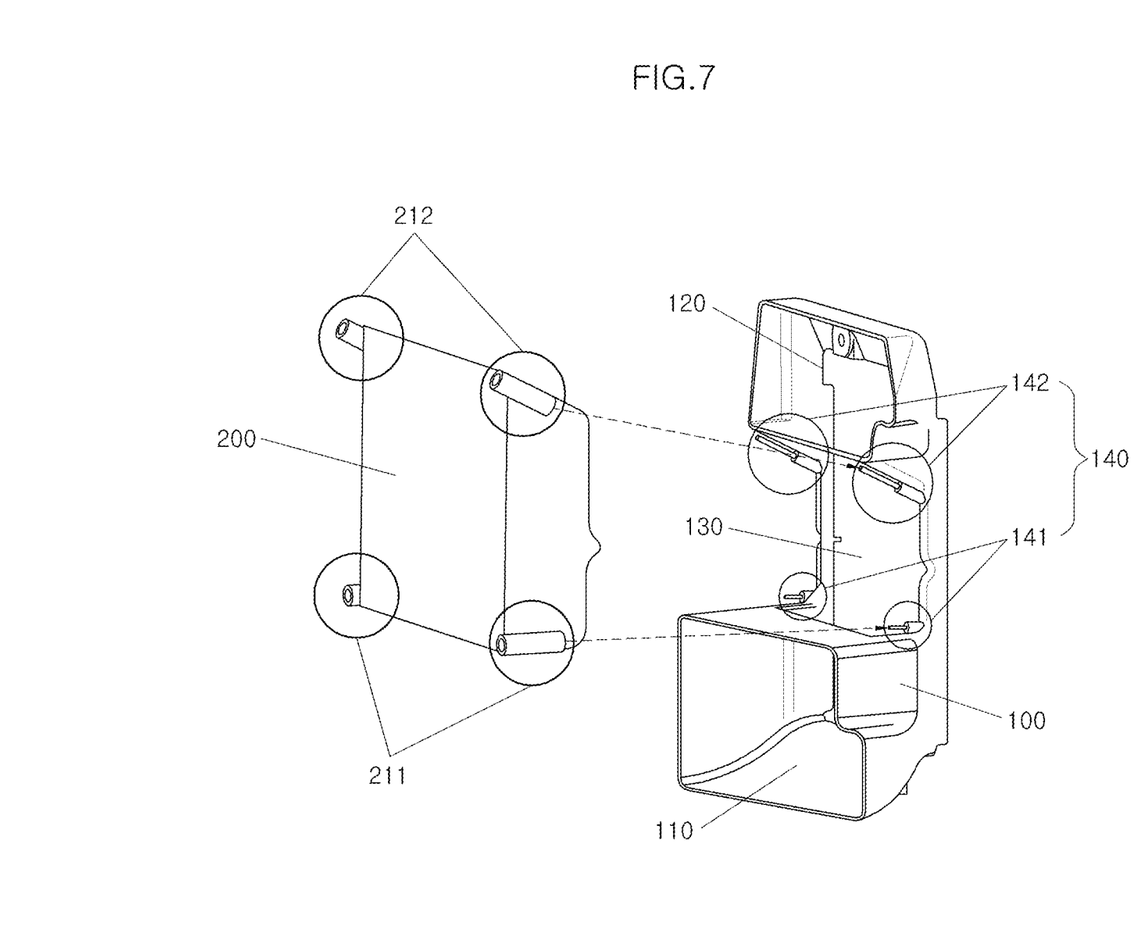
FIG. 7 is an exploded perspective view of the intercooler air-guide of dual duct type for improving crash performance according to the present disclosure.

FIG. 5 is a front perspective view of an intercooler air-guide of dual duct type for improving crash performance according to the present disclosure. FIG. 6 is a rear perspective view of the intercooler air-guide of dual duct type for improving crash performance according to the present disclosure. FIG. 7 is an exploded perspective view of the intercooler air-guide of dual duct type for improving crash performance according to the present disclosure. Referring to FIG. 5 to FIG. 7, an intercooler air-guide of dual duct type for improving crash performance according to the present disclosure serves to guide head wind toward an intercooler.

For this, the intercooler air-guide of dual duct type for improving crash performance may include a guide frame 100 and a guide portion 200.

The guide frame 100 may include a first opening portion 110 and a second opening portion 120. By including a dual duct shape having the first opening portion 110 and the second opening portion 120, the air flow rate supplied to the intercooler can be increased. The first opening portion 110 may be disposed at an upper portion of a back beam and formed toward a vehicle driving direction, and the second opening portion 120 may be disposed at a lower portion of the back beam and formed toward the vehicle driving direction.

The guide frame 100 may include a hole 130 formed between the first opening portion 110 and the second opening portion 120. A guide portion 200 may be coupled to the hole 130 by a first coupling portion 140 and a second coupling portion 210 to be described later.

The first coupling portion 140 may be formed to be protruded toward the vehicle driving direction around the hole 130. The first coupling portion 140 may include a first lower coupling portion 141 protruded in parallel with the vehicle driving direction and a first upper coupling portion 142 protruded upwardly and slantly to form a predetermined angle with respect to the first lower coupling portion 141. The reason that the first lower coupling portion 141 and the first upper coupling portion 142 are formed to be protruded toward the vehicle driving direction with the predetermined angle therebetween, is in order for the guide portion 200 not to be separated by the head wind blowing from the vehicle driving direction. Therefore, without special coupling structure in the present disclosure, the guide portion 200 can be strongly coupled to the guide frame 100 by the shapes of the first lower coupling portion 141 and the first upper coupling portion 142 and the elastic force of the guide portion 200.

The guide portion 200 may be coupled to the guide frame 100 to play a role of improving crash performance. The material of the guide portion 200 may be an elastic member capable of absorbing impact generated by vehicle crash. That is, the crash space between the back beam and the air-guide in the prior art may be eliminated because the guide portion 200 with the elastic material in the present disclosure plays the same role of the crash space as in the prior art and secures the crash performance.

According to one form of the present disclosure, the guide frame 100 is attached on an intercooler and forms the upper opening portions 110 and the low opening portion 120 relative to a back beam. The upper and lower opening portions 110, 120 extend toward an opposite direction to the intercooler. The guide portion 200 is coupled to the guide frame 100 and is disposed between the upper and lower opening portions 110, 120. In particular, the guide portion 200 and the guide frame 100 define an air channel 300 through which an air flow flows from the upper and lower opening portions to the intercooler. Due to this, the cooling efficiency of the intercooler can be improved while securing the crash performance of the prior art level by utilizing the crash space of the prior art as an air passage of the intercooler air-guide.

The guide portion 200 may include a second coupling portion 210 coupled with the first coupling portion 140. The second coupling portion 210 may include a second lower coupling portion 211 coupled with the first lower coupling portion 141, and a second upper coupling portion 212 coupled with the first upper coupling portion 142 and formed upwardly and slantly to form the predetermined angle with respect to the second lower coupling portion 142.

The reason that the second lower coupling portion 211 and the second upper coupling portion 212 are formed to be coupled to the first lower coupling portion 141 and the first upper coupling portion 142, respectively, is in order for the guide portion 200 not to be separated by the head wind blowing from the vehicle driving direction. Therefore, without special coupling structure in the present disclosure, the guide portion 200 can be strongly coupled to the guide frame 100.

The guide portion 200 may include a direction induction guide 220 formed on a side opposite to the vehicle driving direction and formed to be protruded in a direction vertical to the ground. The direction induction guide 220 may serve to increase the air flow rate passing through the intercooler by evenly inducing the air flow flowed into the inside of the guide frame 100. As the air flow rate passing through the intercooler is increased, the cooling efficiency of the intercooler can be improved.

Figure 4:
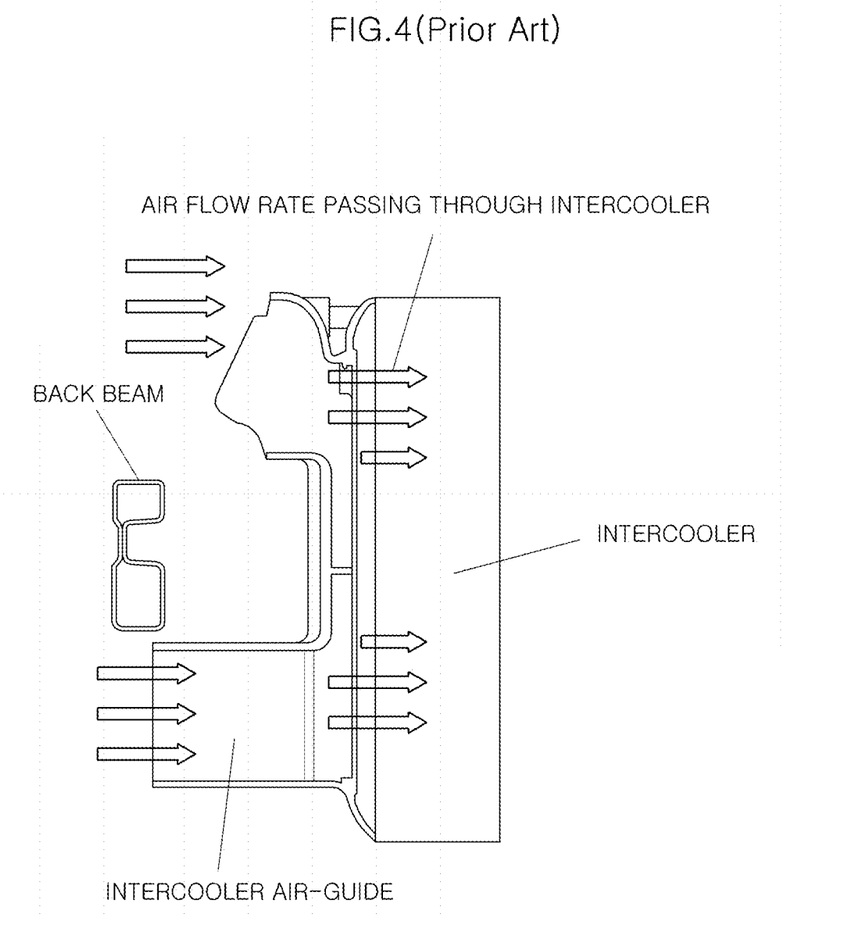
FIG. 4 illustrates an air flow of the intercooler air-guide according to the prior art.
Figure 8:
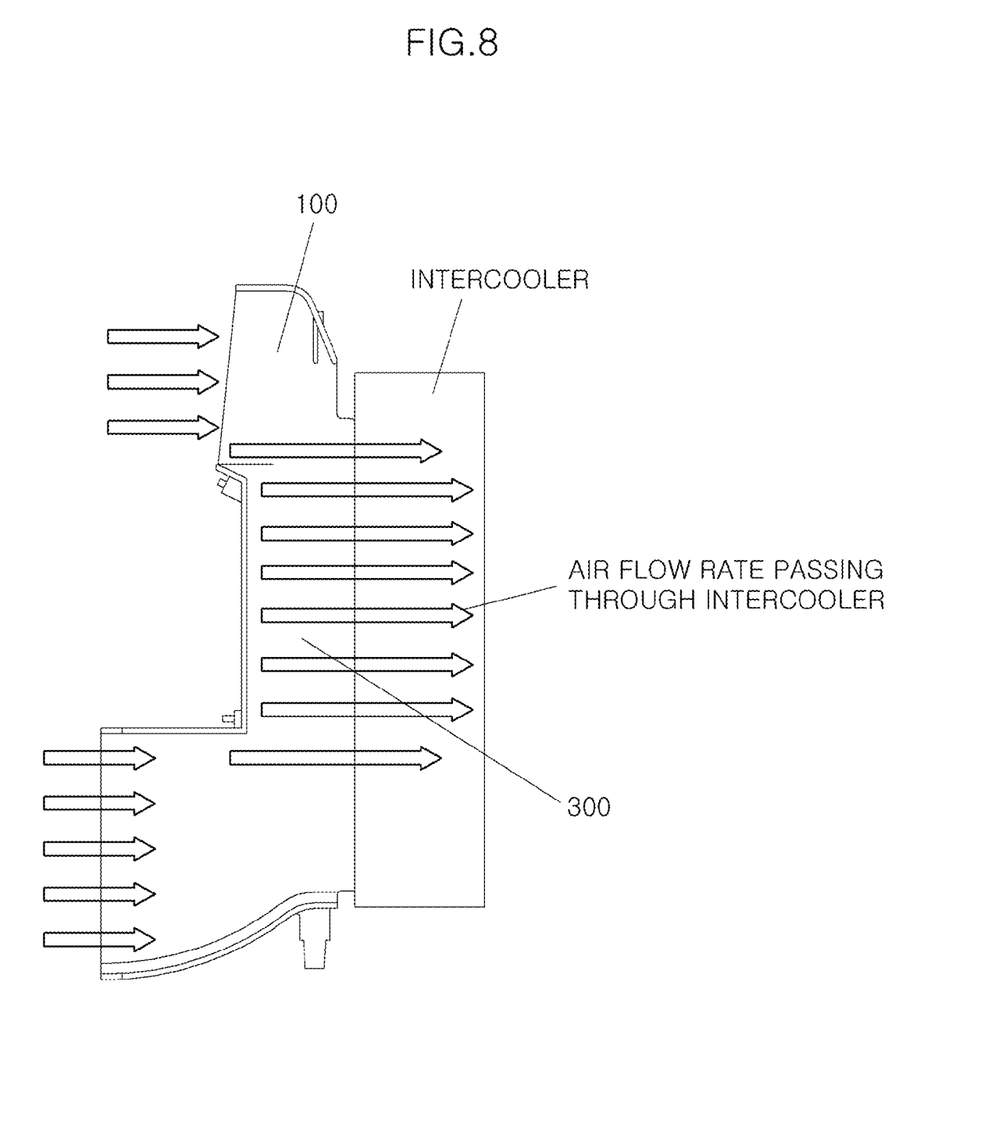
FIG. 8 and FIG. 9 illustrate the air flow of the intercooler air-guide of dual duct type for improving crash performance according to the present disclosure, respectively.
Figure 9:
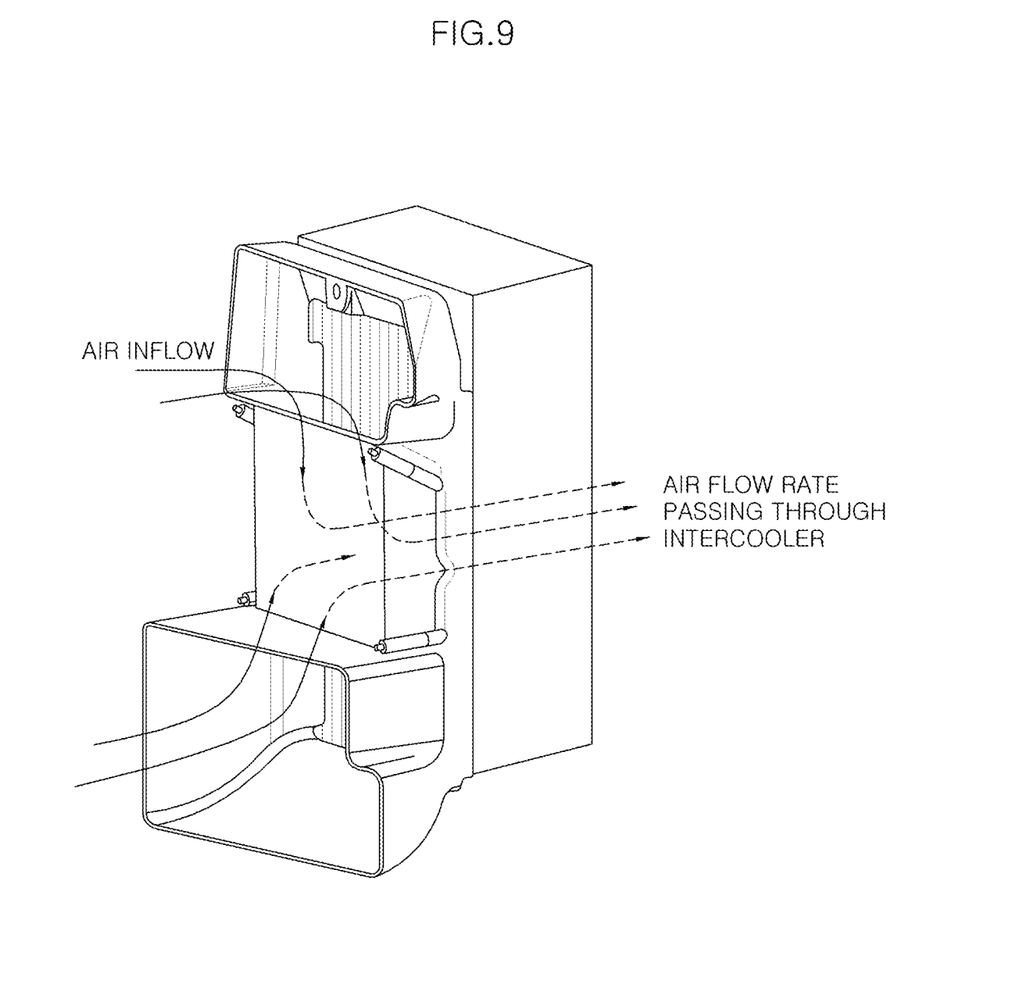

FIG. 8 and FIG. 9 are drawings explaining air flow of the intercooler air-guide of dual duct type for improving crash performance according to the present disclosure, respectively. Referring to FIG. 8 and FIG. 9, the air flowed into through the first opening portion 110 and the second opening portion 120 passes through the inside of the guide frame 100 and then the passes through intercooler. At this time, the air flowed into can be evenly induced by the direction induction guide 220 such that the air flow rate passing through the intercooler can be increased. Further, as the inside space of the guide frame 100 is enlarged in the present disclosure as compared to the prior art, the air flow rate passing through the intercooler is increased as compared to the prior art (referring to FIG. 4 and FIG. 8).

Figure 10:
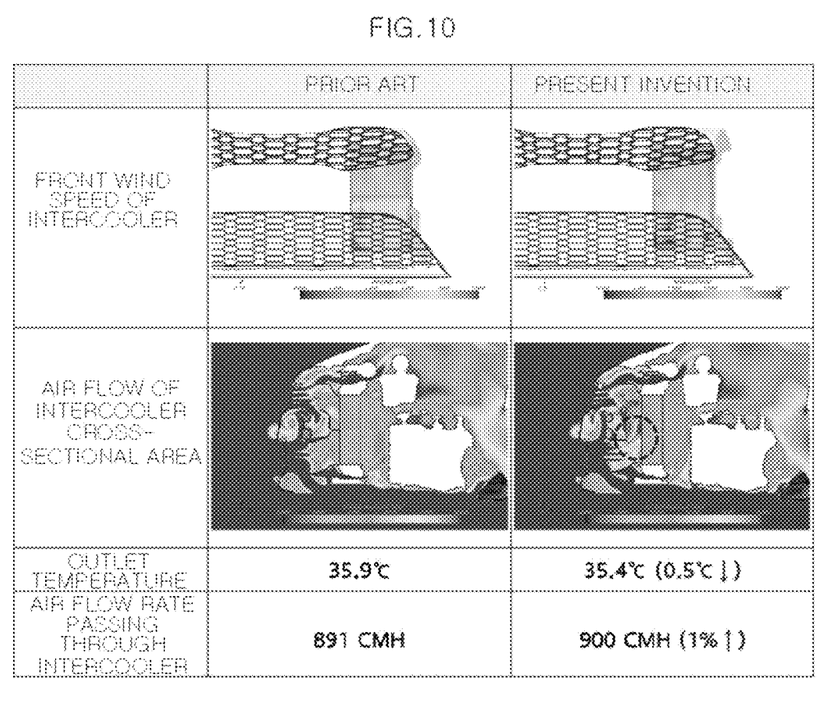
FIG. 10 is a drawing explaining the effects of the present disclosure.

Referring to FIG. 10, the intercooler outlet temperature (35.4° C.) of the present disclosure is 0.5° C. below as compared to the intercooler outlet temperature (35.9° C.) of the prior art. Furthermore, the air flow rate (900 CMH, cubic meter per hour) passing through the intercooler of the present disclosure is increased by 1% as compared to the air flow rate (891 CMH) passing through the intercooler of the prior art. As such, the cooling efficiency of the intercooler is improved by applying the present disclosure as compared to the prior art.

The exemplary form as discussed previously is merely a desirable form which may enable a person (hereinafter referred to as 'a skilled person in the relevant technology'), who has a typical knowledge in a technology field that the present disclosure belongs to, to execute the present disclosure easily. Therefore, it will be apparent to a skilled person in the relevant technology that several transposition, transformation, and change is possible within a scope of not deviating from the technological thought in the present disclosure and it is obvious that a easily changeable part by a skilled person in the relevant technology is included within the scope of right in the present disclosure as well.

What is claimed is:

1. An intercooler air-guide of dual duct type for improving crash performance and guiding head wind toward an intercooler, comprising:
    a guide frame comprising a first opening portion and a second opening portion; and
    a guide portion coupled to the guide frame to improve crash performance of the intercooler air-guide of dual duct type,
    wherein the first opening portion is disposed at an upper portion of a back beam and formed toward a vehicle driving direction,
    wherein the second opening portion is disposed at a lower portion of the back beam and formed toward the vehicle driving direction,
    wherein the guide frame comprises a hole formed between the first opening portion and the second opening portion, and
    wherein the guide frame comprises a first coupling portion formed to be protruded toward the vehicle driving direction around the hole.

2. The intercooler air-guide according to claim 1, wherein the first coupling portion comprises:
    a first lower coupling portion protruded in parallel with the vehicle driving direction; and
    a first upper coupling portion protruded upwardly and slantly to form a predetermined angle with respect to the first lower coupling portion.

3. The intercooler air-guide according to claim 1, wherein the guide portion comprises a second coupling portion coupled with the first coupling portion.

4. The intercooler air-guide according to claim 3, wherein the second coupling portion comprises:
    a second lower coupling portion coupled with a first lower coupling portion of the first coupling portion; and
    a second upper coupling portion coupled with a first upper coupling portion of the first coupling portion and formed upwardly and slantly to form a predetermined angle with respect to the second lower coupling portion.

5. The intercooler air-guide according to claim 1, wherein the guide portion comprises a direction induction guide formed on a side opposite to the vehicle driving direction and formed to be protruded in a direction vertical to a ground.

6. The intercooler air-guide according to claim 1, wherein a material of the guide portion is an elastic member configured to absorb an impact generated by a vehicle crash.

* * * * *